(12) United States Patent
Koizumi et al.

(10) Patent No.: US 10,546,600 B1
(45) Date of Patent: Jan. 28, 2020

(54) MAGNETIC HEAD WITH HIGH-FREQUENCY OSCILLATING ELEMENT AND DISK DEVICE COMPRISING THE SAME

(71) Applicants: Kabushiki Kaisha Toshiba, Minato-ku, Tokyo (JP); Toshiba Electronic Devices & Storage Corporation, Minato-ku, Tokyo (JP)

(72) Inventors: Gaku Koizumi, Kanagawa (JP); Masaya Ohtake, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/213,195

(22) Filed: Dec. 7, 2018

(30) Foreign Application Priority Data

Aug. 24, 2018 (JP) .................................. 2018-157374

(51) Int. Cl.
  *G11B 5/012* (2006.01)
  *G11B 5/60* (2006.01)
(52) U.S. Cl.
  CPC ............ *G11B 5/012* (2013.01); *G11B 5/6082* (2013.01)
(58) Field of Classification Search
  CPC .............................. G11B 5/012; G11B 5/6082
  See application file for complete search history.

(56) References Cited

U.S. PATENT DOCUMENTS

| 8,804,284 B1* | 8/2014 | Ohtake ................ G11B 5/1278 360/125.3 |
|---|---|---|
| 9,111,552 B1 | 8/2015 | Takeo et al. |
| 9,275,672 B2 | 3/2016 | Shiroishi et al. |
| 9,881,637 B1 | 1/2018 | Wilson et al. |
| 2012/0134046 A1* | 5/2012 | Matsumoto ............ G11B 5/314 360/99.08 |
| 2013/0271869 A1* | 10/2013 | Taguchi ................... G11B 5/23 360/99.08 |
| 2014/0118861 A1 | 5/2014 | Funayama |
| 2015/0043106 A1* | 2/2015 | Yamada ............... G11B 5/1278 360/123.05 |
| 2016/0225392 A1* | 8/2016 | Takeo .................. G11B 5/3166 |
| 2017/0140779 A1* | 5/2017 | Koui ........................ G11B 5/09 |

FOREIGN PATENT DOCUMENTS

| JP | 2012-014792 A | 1/2012 |
|---|---|---|
| JP | 2014-086122 A | 5/2014 |

* cited by examiner

*Primary Examiner* — Brian E Miller
(74) *Attorney, Agent, or Firm* — White & Case LLP

(57) ABSTRACT

According to one embodiment, a magnetic head includes a main pole, a write shield magnetic pole opposed to the main pole with a write gap, and a high-frequency oscillator provided between the main pole and the write shield magnetic pole within the write gap. The main pole includes a shield-side end surface opposing the write shield magnetic pole with the write gap and brought into contact with the high frequency oscillator. The high-frequency oscillator has a width in a cross-track direction, in an air bearing surface, greater than a width of the shield-side end surface in the cross-track direction. The high-frequency oscillator is disposed to extend over at least one end edge of the shield-side end surface in the cross-track direction to an outer side of the main pole.

12 Claims, 13 Drawing Sheets

F.I.G. 1

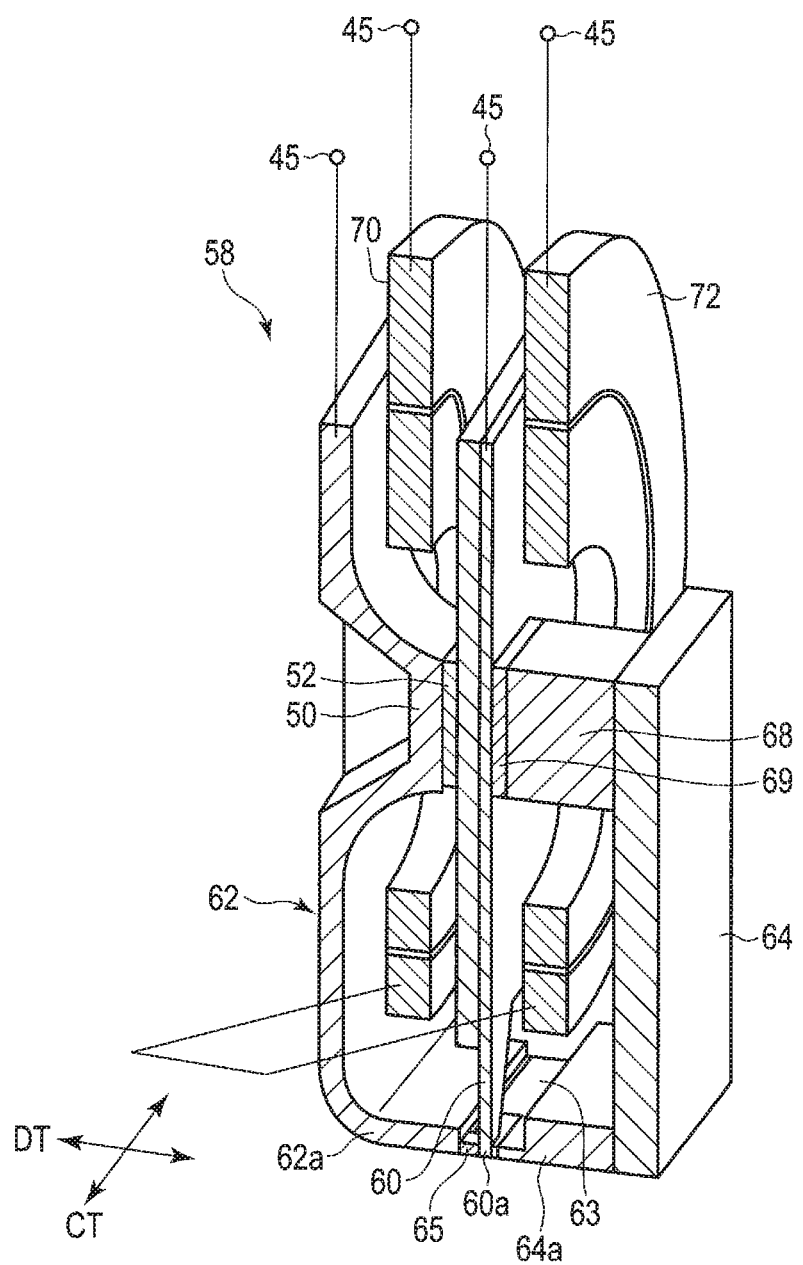
F I G. 4

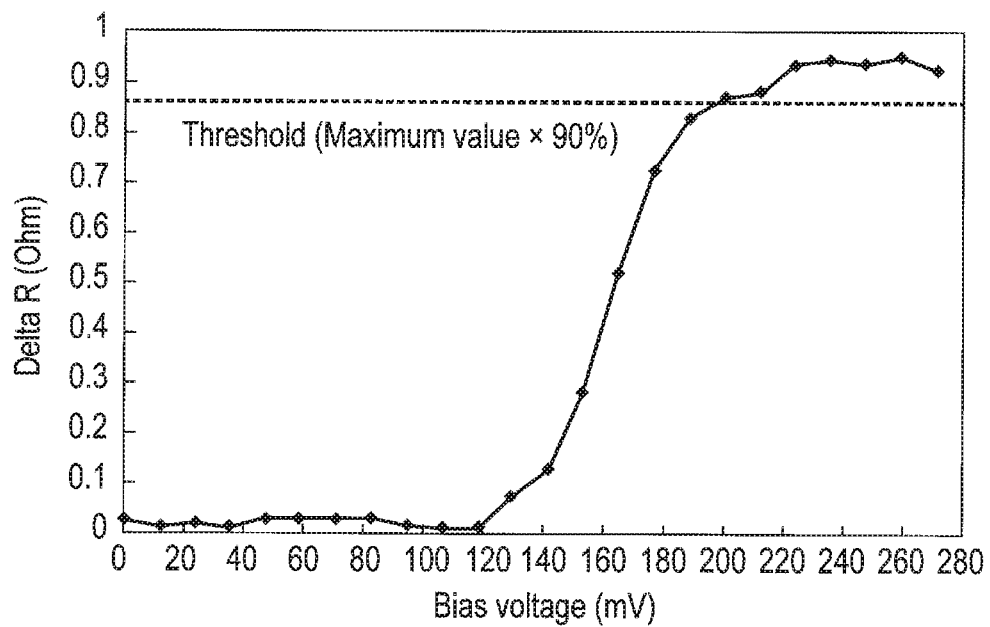
F I G. 9A
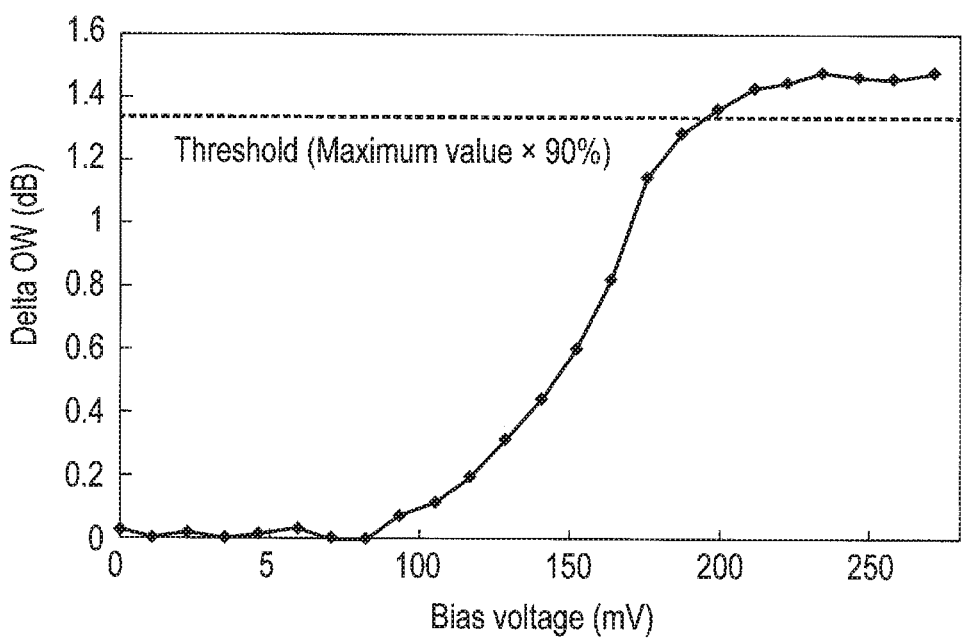
F I G. 9B

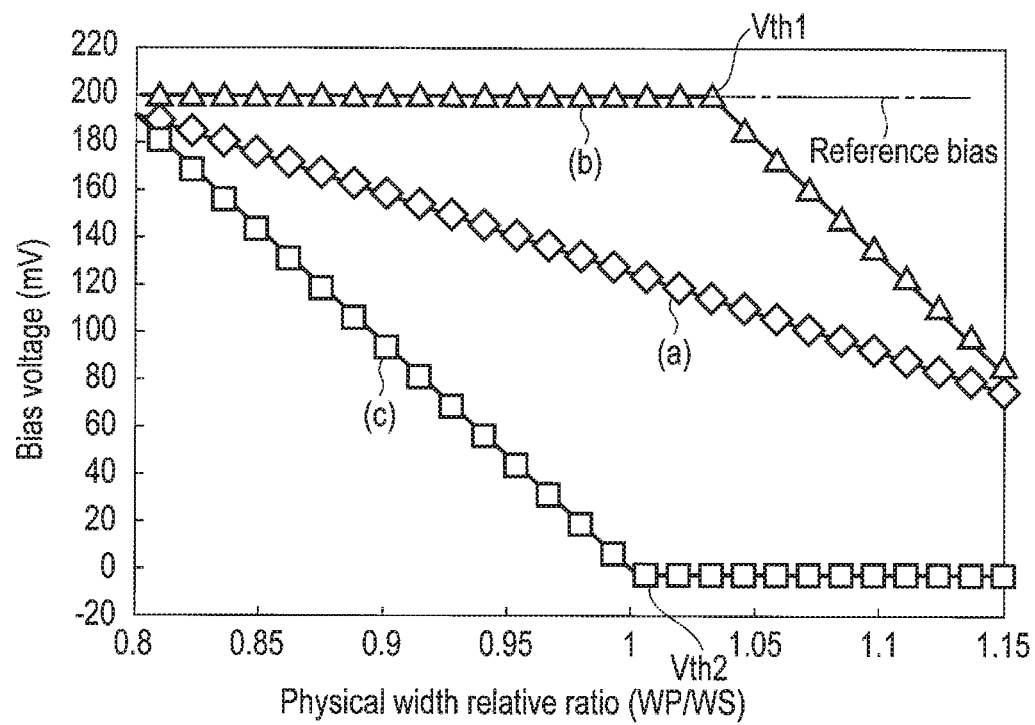
F I G. 10
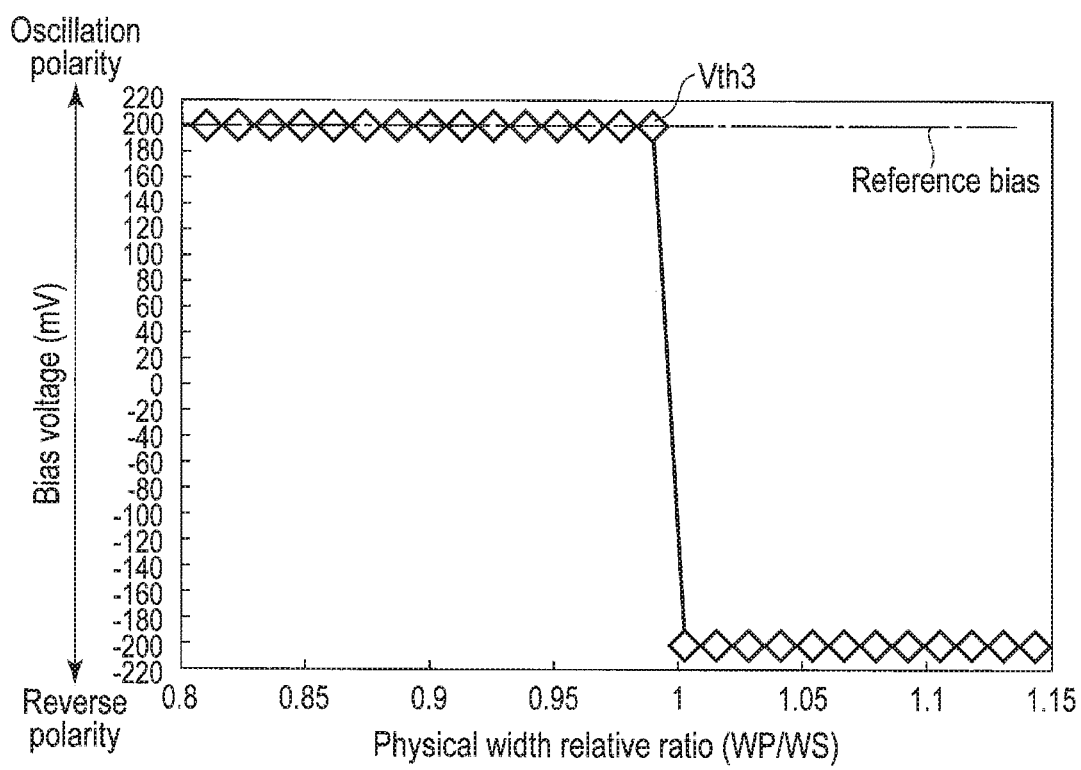
F I G. 11

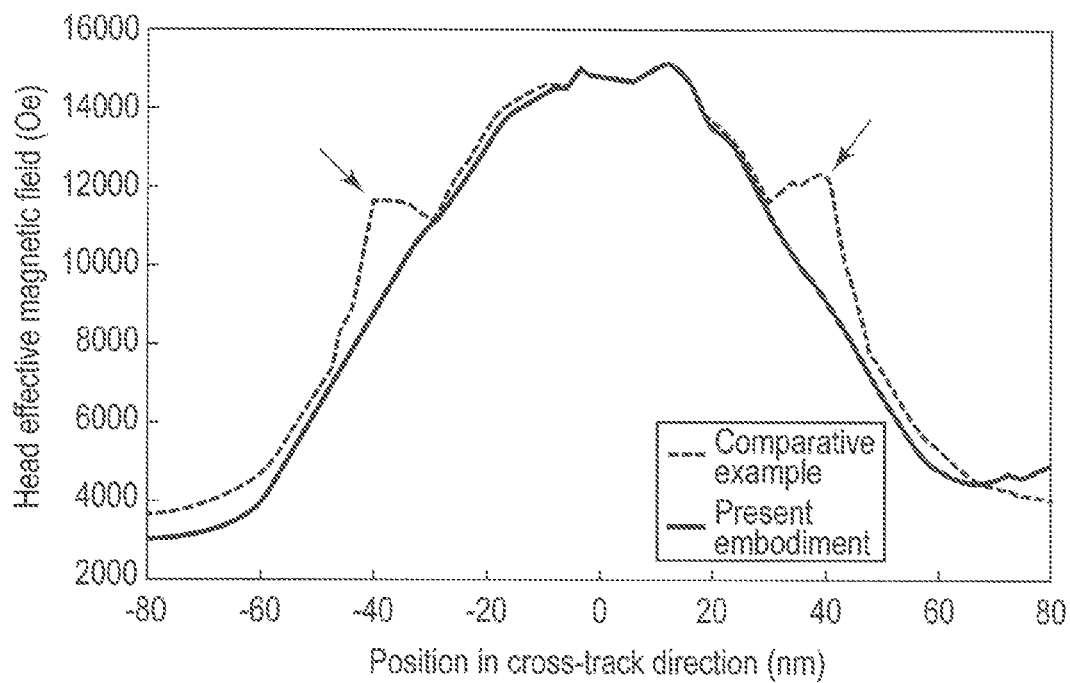
F I G. 12
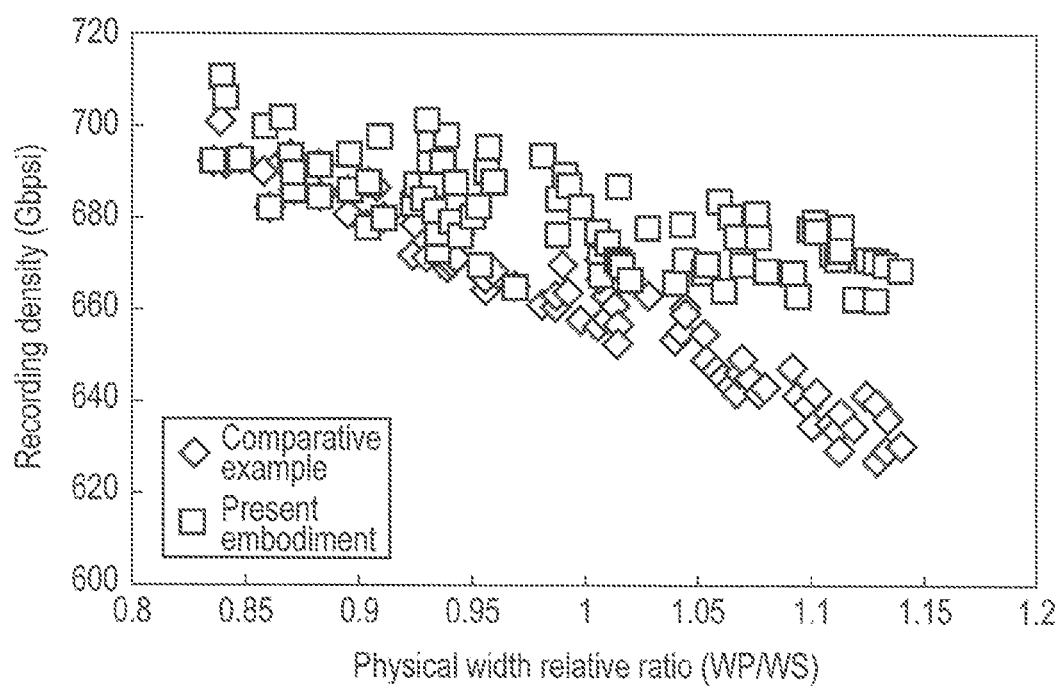
F I G. 13

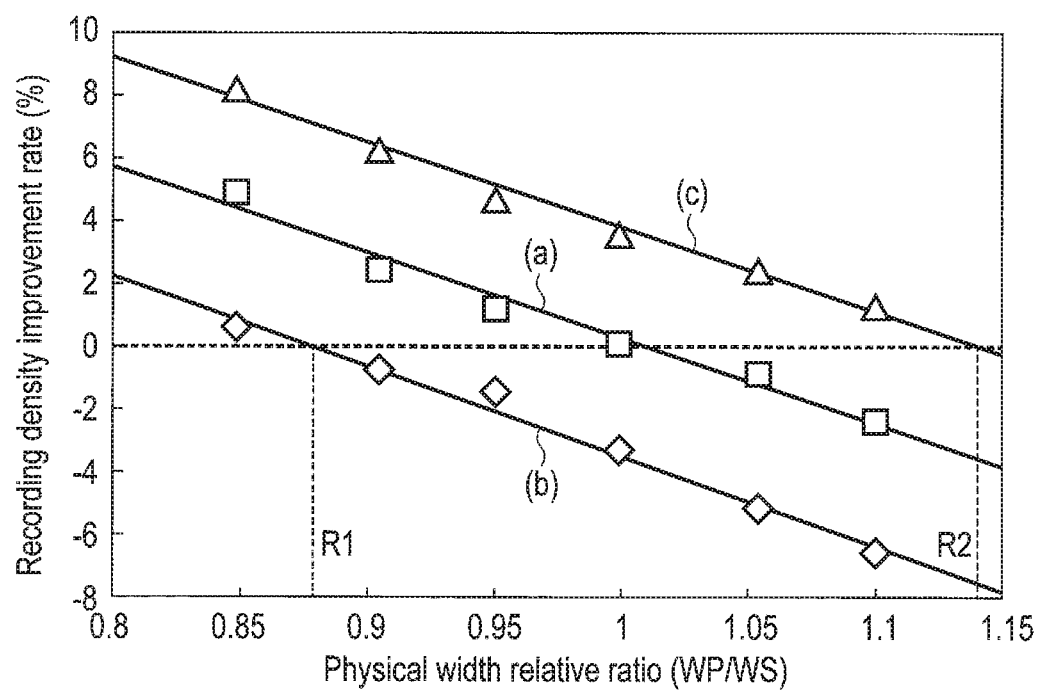
F I G. 14

MAGNETIC HEAD WITH HIGH-FREQUENCY OSCILLATING ELEMENT AND DISK DEVICE COMPRISING THE SAME

CROSS REFERENCE TO RELATED APPLICATIONS

This application is based upon and claims the benefit of priority from Japanese Patent Application No. 2018-157374, filed Aug. 24, 2018, the entire contents of which are incorporated herein by reference.

FIELD

Embodiments described herein relate generally to a magnetic head and a disk device comprising the magnetic head.

BACKGROUND

In recent years, a magnetic disk device using a magnetic head for perpendicular magnetic recording has been proposed in order to achieve higher recording density, larger capacity, and miniaturization. In this type of magnetic head, the recording head comprises a main magnetic pole which produces a perpendicular magnetic field, a write shield magnetic pole provided on the trailing side of the main magnetic pole across an intervening write gap, and a coil for supplying a magnetic flux to the main magnetic pole. Further, a recording head of a high-frequency assist recording mode has been proposed, in which a high frequency assist element, for example, a spin torque oscillator, is provided in the write gap between the write shield magnetic pole and the main pole, and a high-frequency field is applied to the magnetic recording layer of a magnetic disk by the spin torque oscillator.

However, in the high frequency assist recording head comprising a spin torque oscillator, while the spin torque oscillator being driven, a return magnetic field from an end portion of the main pole to the write shield magnetic pole side may increase, which, in some cases, cause adverse effect on a recorded signal on an adjacent track aside from the original high-frequency assist effect.

BRIEF DESCRIPTION OF THE DRAWINGS

FIG. 4 is a perspective view schematically showing a recording head of the magnetic head.

FIG. 9A is a diagram showing the relationship between a bias voltage and a differential absolute value delta, used to set a reference bias voltage.

FIG. 9B is a diagram showing the relationship between a bias voltage and a differential absolute value delta OW, used to set a reference bias voltage.

FIG. 10 is a diagram showing an example of adjustment of a bias voltage according to a physical width relative ratio WP/WS.

FIG. 11 is a diagram showing another example of adjustment of a bias voltage according to a physical width relative ratio WP/WS.

FIG. 12 is a diagram showing the relationship between the cross track directional position of a recording head and a head effective field for the recording head of the HOD according this embodiment and a recording head of a HOD according to a comparative example, as compared with each other.

FIG. 13 is a diagram showing the relationship between a physical width relative ratio WP/WS and recording density for the recording head of the HOD according to a comparative example and the recording head of the HOD according this embodiment, as compared with each other.

FIG. 14 is a characteristic diagram showing the dependency of a recording density improvement rate on the physical width relative ratio WP/WS while applying STO bias voltage in this embodiment.

DETAILED DESCRIPTION

Figure 1:
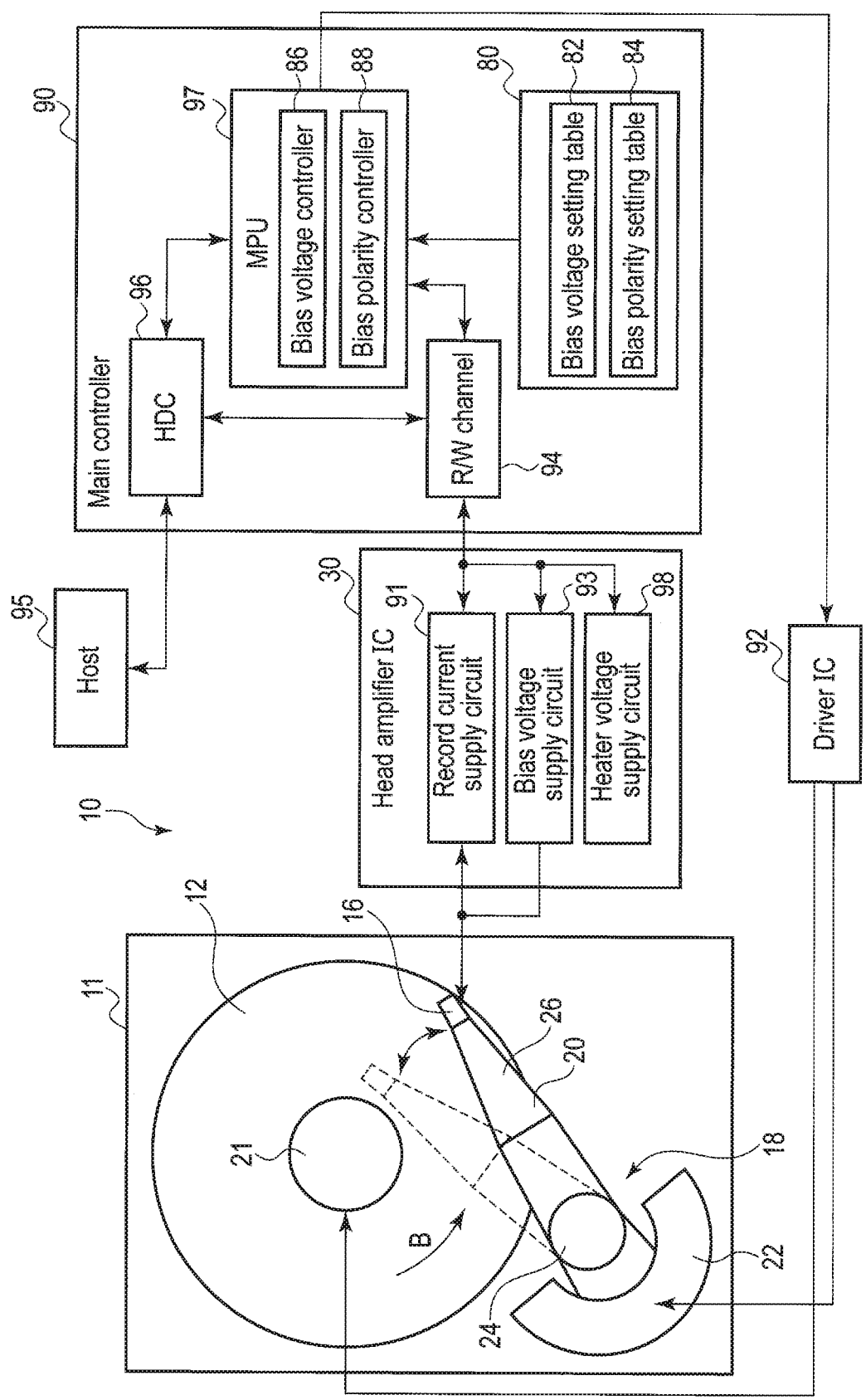
FIG. 1 is a block diagram schematically showing a hard disk drive (HDD) according to a first embodiment.

Various embodiments will be described hereinafter with reference to the accompanying drawings. In general, according to one embodiment, a magnetic head comprises an air bearing surface, a main pole comprising a distal end portion extending to the air bearing surface, a write shield magnetic pole opposed to the distal end portion of the main pole with a write gap therebetween and constituting a magnetic core with the main pole, a coil which excites magnetic flux to the magnetic core, and a high-frequency oscillation element provided between the main pole and the write shield magnetic pole within the write gap. The main pole comprises a shield side end surface opposing the write shield magnetic pole with the write gap therebetween and brought into contact with the high frequency oscillation element. The high-frequency oscillation element has a width WS in a cross track direction, which is, in the air bearing surface, greater than a width WP of the shield-side end surface in the cross-track direction, and the high-frequency oscillation element is disposed to extend over at least one end edge of the shield-side end surface along the cross-track direction to an outer side of the main pole.

What is disclosed in this specification is merely an example. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, ele-

First Embodiment

Figure 2:
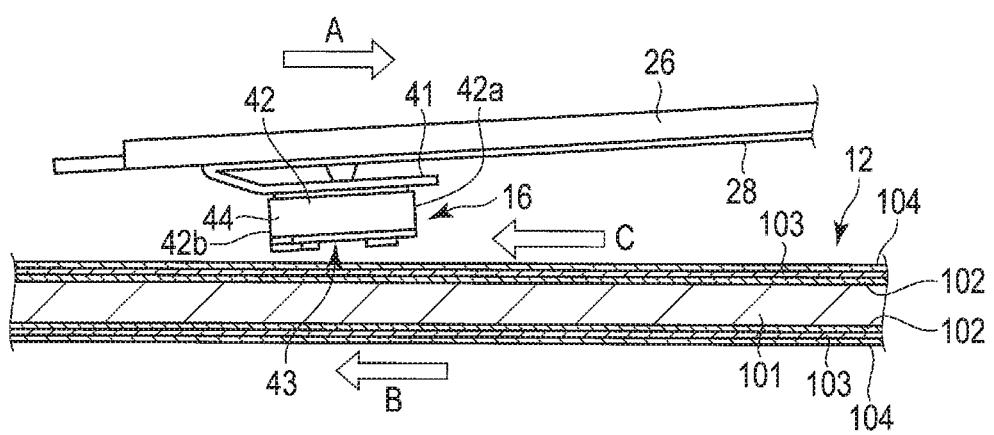
FIG. 2 is a side view schematically showing a magnetic head, a suspension, and a magnetic disk in the HDD of FIG. 1.

A hard disk drive (HDD) according to a first embodiment as a disk device will be described in detail. FIG. 1 is a block diagram schematically showing the HDD according to the embodiment. FIG. 2 is a side view showing a magnetic head in a flying state and a magnetic disk.

As shown in FIG. 1, a HDD 10 comprises a rectangular housing 11, a magnetic disk 12 as a recording medium disposed in the housing 11, a spindle motor 21 which supports and rotates the magnetic disk 12, and magnetic heads 16 which write and read data to and from the magnetic disk 12. The HOD 10 comprises a head actuator 18 which moves each magnetic head 16 to above an arbitrary track on the magnetic disk 12 for positioning. The head actuator 18 comprises a carriage assembly 20 which supports the magnetic heads 16 movably, and a voice coil motor (VCM) 22 which rotates the carriage assembly 20.

The HOD 10 comprises a head amplifier IC 30 which drives the magnetic heads 16, a main controller 90 and a driver IC 92. The head amplifier IC 30 is, for example, provided in the carriage assembly 20 and electrically connected to the magnetic heads 16. The head amplifier IC 30 comprises a record current supply circuit (record current supply portion) 91 which supplies a record current to a recording coil of each magnetic head 16, a bias voltage supply circuit 93 which supplies a bias voltage (drive current) to a spin torque oscillator (STO), which will be described later, a heater voltage supply circuit 98 which supplies drive voltage to a heater, which will be described later, an amplifier (not shown) which amplifies signals read by the magnetic heads and the like.

The main controller 90 and driver IC 92 are each constituted by a control circuit board (not shown) provided on a rear surface side of the housing 11, for example. The main controller 90 comprises an R/W channel 94, a hard disk controller (HOC) 96, a microprocessor (MPU) 97 and a memory 80. The main controller 90 is electrically connected to the magnetic heads 16 via the head amplifier IC 30. The main controller 90 is electrically connected to the VCM 22 and the spindle motor 21 via the driver IC 92. The HOC 96 is connectable to a host computer 95. The main controller 90 includes the memory 80. The memory 80 accommodates a STO bias voltage setting table 82 which contains a relationship between a physical width relative ratio of the recording head, which will be described later, and an optimal STO bias voltage in each case, and a STO bias polarity setting table 84 which contains a relationship between the physical width relative ratio and the polarity of the optimal STO bias voltage in each case.

In the main controller 90, for example, the MPU 97 includes an STO bias voltage controller 86 which adjusts the STO bias voltage based on the STO bias voltage setting table 82, and an STO bias polarity controller 88 which controls the polarity of the STO bias voltage based on the STO bias polarity setting table 84.

As shown in FIGS. 1 and 2, the magnetic disk 12 is constructed as a perpendicular magnetic recording medium. The magnetic disk 12 includes a substrate 101 formed, for example, into a disk shape having a diameter of 88.9 mm (3.5 inches) from a nonmagnetic member. On each surface of the substrate 101, a soft magnetic layer 102 made of a material exhibiting a soft magnetic property as an underlayer, a perpendicular magnetic recording layer 103 having magnetic anisotropy in a direction perpendicular to the surface of the magnetic disk 12, and a protective film 104 are stacked in order.

The magnetic disk 12 is fitted to a hub of the spindle motor 21, such as to be coaxial with each other. The magnetic disk 12 is rotated by the spindle motor 21 at a predetermined speed in a direction pointed by an arrow B. The carriage assembly 20 comprises a bearing unit 24 rotatably supported on the housing 11 and suspensions 26 extending from the bearing unit 24. As shown in FIG. 2, the magnetic heads 16 are respectively supported by extending edges of the suspensions 26. The magnetic heads 16 are electrically connected to the head amplifier IC 30 via a wiring member (flexure) 28 provided on the carriage assembly 20.

As shown in FIG. 2, each of the magnetic heads 16 is formed as a flying head, and comprises a slider 42 formed in a substantially rectangular parallelepiped shape, and a head portion 44 formed in an outflow end (trailing) side of the slider 42. The slider 42 is made from a sintered body of alumina and titanium carbide (AlTiC). The head portion 44 is made of a plurality of thin layers. The slider 42 is attached to a gimbal portion 41 of the wiring member 28.

The slider 42 comprises a rectangular disk-facing surface (air bearing surface [ABS]) 43 facing the surface of the magnetic disk 12. The slider 42 is kept flying at a predetermined distance from the surface of the magnetic disk 12, because of an airflow C produced between the disk surface and the ABS 43 by the rotation of the magnetic disk 12. The direction of the airflow C coincides with a rotating direction B of the magnetic disk 12. The slider 42 comprises a leading end 42a located on an inflow side of the air flow C and a trailing end 42b located on an outflow side of the air flow C. With the rotation of the magnetic disk 12, the magnetic heads 16 run above the magnetic disk 12 in a direction pointed by an arrow A (head travel direction), that is, an opposite direction to the rotating direction B of the disk.

Figure 3:
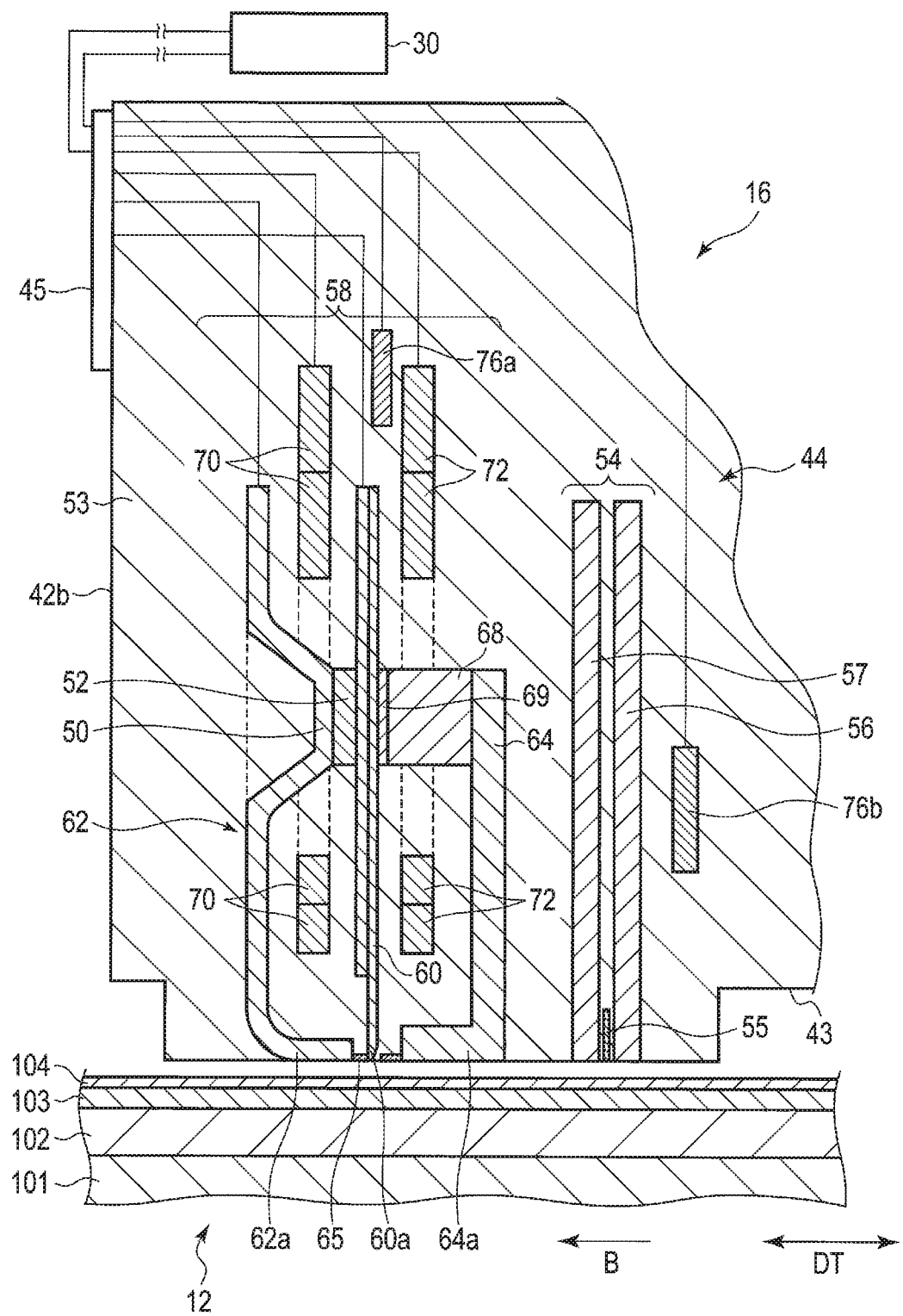
FIG. 3 is an enlarged sectional view showing a head portion of the magnetic head.

FIG. 3 is an enlarged cross-sectional view showing a head portion 44 of the magnetic head 16 and the magnetic disk 12. The head portion 44 is formed as a separation-type magnetic head and comprises a reproducing head (read head) 54 and a recording head (writer) 58 which are formed on the trailing end 15b of the slider 42 by a thin film process. The reproducing head 54 and the recording head 58 are covered by a nonmagnetic protective insulating film 53 except for portions exposed to the ABS 13 of the slider 42. The protective insulating film 53 forms an outer shape of the head portion 44.

A longitudinal direction of each recording track on the magnetic recording layer 103 of the magnetic disk 12 is defined as a down track direction DT, and a width direction of recording track as a cross-track direction WT.

The reproducing head 54 comprises a magnetoresistive element 55, a first magnetic shield film 56 and a second magnetic shield film 57 which are disposed on the trailing side (outflow) side and the leading side (inflow side) of the magnetoresistive element 55 in the down track direction DT so as to interpose the magnetoresistive element 55 therebetween. The magnetoresistive element 55 and the first and second magnetic shield films 56 and 57 extend to be substantially perpendicular to the ABS 43. Lower ends of the magnetoresistive element 55 and the first and second magnetic shield films 56 and 57 are exposed to the ABS 43.

Figure 5:
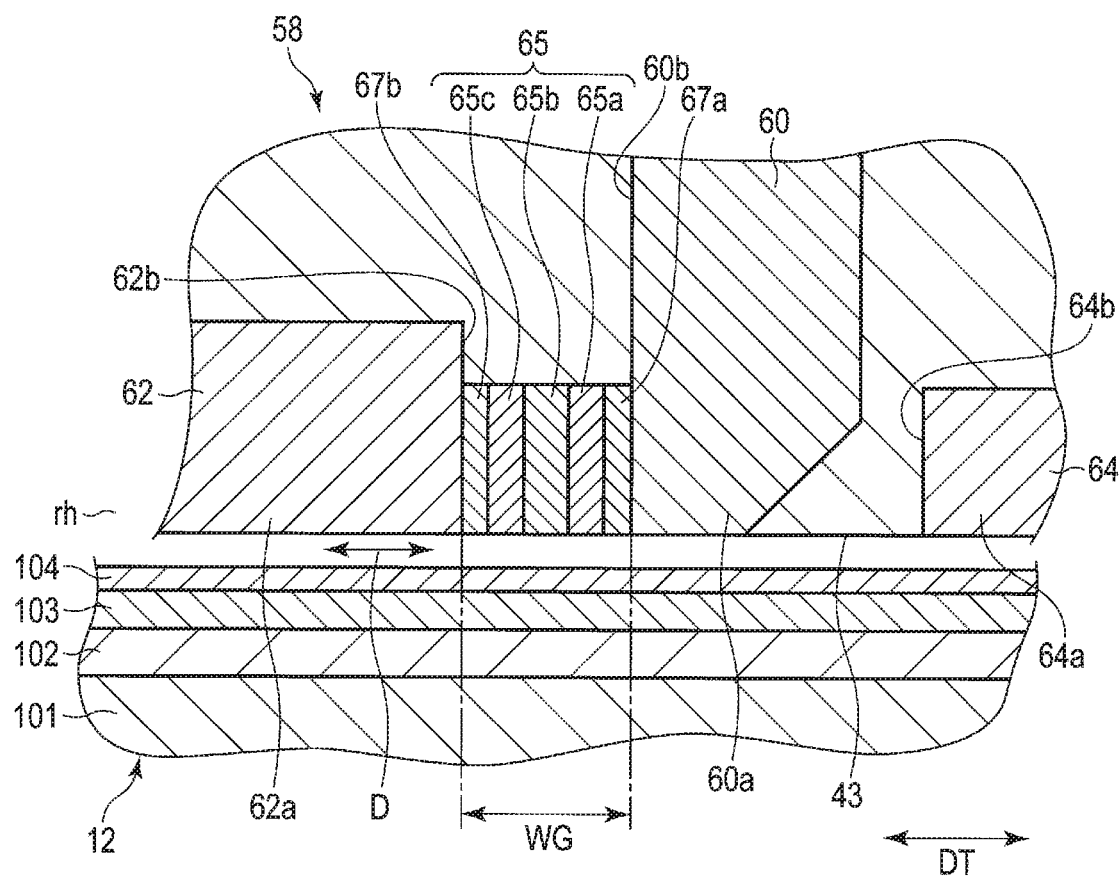
FIG. 5 is an enlarged sectional view showing a distal end portion of the magnetic head.
Figure 6:
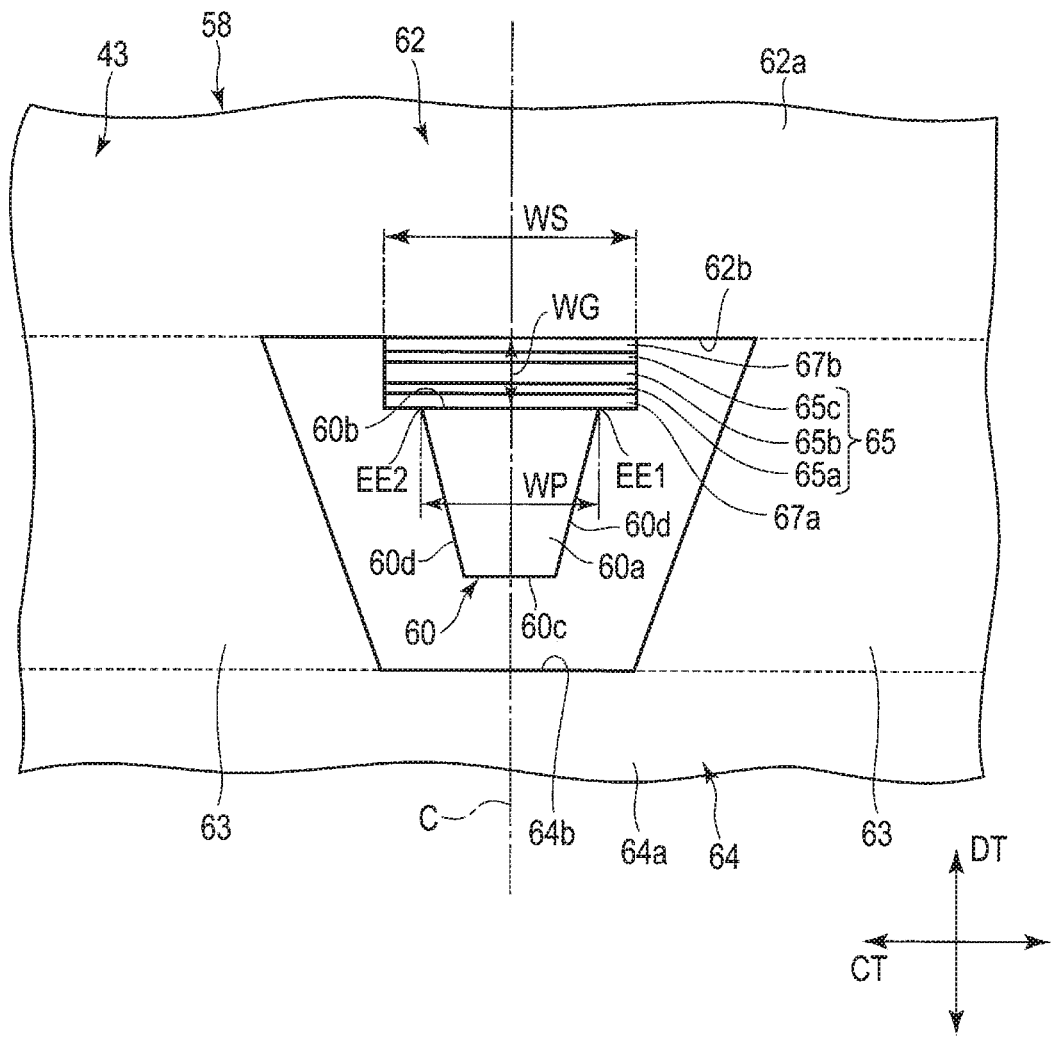
FIG. 6 is a plan view showing the recording head of the magnetic head as viewed from an ABS side.

The recording head 58 is provided on the trailing end 42b side of the slider 42 relative to the reproduction head 54. FIG. 4 is a perspective view of the recording head cut along in the track center and FIG. 5 is an enlarged cross sectional view of a distal end portion (ABS side end portion) of the recording head. FIG. 6 is a plan view of the recording head as viewed from the ABS side.

As shown in FIGS. 3 and 4, the recording head 58 includes a main pole 60 which produces a recording magnetic field perpendicular to the surface of the magnetic disk 12, a trailing shield (a write shield magnetic pole, a first shield) 62 provided on the trailing side of the main pole 60 and opposing the main pole 60 while interposing a write gap WG therebetween, a leading shield (second shield) 64 opposing the leading side of the main pole 60, a pair of side shields 63 provided respectively on both sides of the main pole 60 in the cross-track direction CT, and a high-frequency oscillation element 65 provided between the main pole 60 and the trailing shield 62 within the write gap WG, that is, for example, a spin torque oscillator (STO) 65. The main magnetic pole 60 and the trailing shield 62 constitute a first magnetic core which forms a magnetic path. The main magnetic pole 60 and the leading shield 64 constitute a second magnetic core which forms a magnetic path. The recording head 58 comprises a first recording coil 70 wound around the first magnetic core and a second recording coil 72 wound around the second magnetic core.

The main magnetic pole 60 is formed of a soft magnetic material having high magnetic permeability and high saturation magnetic flux density, and extends substantially perpendicular to the ABS 43. A distal end portion 60a of the main pole 60 on an ABS 43 side is tapered down to narrow toward the ABS 43 and is formed into a columnar shape narrower than other portions. A distal end surface of the main pole 60 is exposed to the ABS 43 of the slider 42.

As shown in FIGS. 5 and 6, the distal end portion 60a of the main pole 60 is formed to have a cross section of a trapezoid, for example. The trapezoidal distal end portion (distal end surface) 60a includes a flat trailing-side end surface 60b extending in the cross-track direction CT, a leading-side end surface 60c opposing the trailing-side end surface 60b and both side surfaces 60d. The trailing-side end surface 60b is opposed to the trailing shield 62 with a gap therebetween. In the ABS 43, the width of the distal end portion 60a, i.e., a width WP of the trailing-side end surface 60b in the cross-track direction CT is substantially equivalent to the track width of the recording track in the magnetic disk 12. In the distal end portion 60a, the trailing-side end surface 60b and the leading-side end surface 60c may extend in a direction perpendicular to the ABS 43, or extend to incline with respect to the direction perpendicular to the ABS 43. Both the side surfaces 60d extend to incline with respect to the central axis line C of the main pole 60, that is, the down-track direction DT.

As shown in FIGS. 3 to 6, the trailing shield 62 is formed from a soft magnetic material and is provided to efficiently close the magnetic path via the soft magnetic layer 102 of the magnetic disk 12 directly under the main pole 60. The trailing shield 62 is disposed on the trailing side of the main pole 60. The trailing shield 62 is formed into an approximately L-shape and the distal end portion 62a thereof is formed into a slender rectangle. The distal end surface of the trailing shield 62 is exposed to the ABS 43 of the slider 42. The distal end portion 62a comprises a leading-side end surface (magnetic pole end surface) 62b opposing the distal end portion 60a of the main pole 60 with a gap. The leading side end surface 62b has a length sufficiently greater than the width WP of the distal end portion 60a of the main pole 60 and the track width of the magnetic disk 12, and extends in the cross-track direction CT. The leading side end surface 62b extends perpendicularly to or to incline slightly with respect to the ABS 43. On the ABS 43, the lower end edge of the leading side end surface 62b opposes parallel to the trailing side end surface 60b of the main pole 60 with the write gap WG therebetween (a gap length in the down-track direction DT).

As shown in FIGS. 4 and 5, the trailing shield 62 comprises a first connection portion 50 connected to the main pole 60. The first connection portion 50 is magnetically connected to an upper portion of the main pole 60, that is, a portion located away from the ABS 43 of the main pole 60 via a non conductive body 52. The first recording coil 70 is wound around, for example, the first connection portion 50 in the first magnetic core. To write a signal to the magnetic disk 12, a recording current is allowed to flow the first recording coil 70, and thus the first recording coil 70 excites the main magnetic pole 60 to apply a magnetic flux thereto.

As shown in FIGS. 4 and 6, the pair of side shields 63 are disposed respectively on both sides of the main pole 60 in the cross-track direction CT so as to be physically separated from the main pole 60 and connected to the trailing shield 62. In this embodiment, the side shields 63 are formed from a high magnetic permeability material so as to be integrated with the distal end portion 62a of the trailing shield 62 as one body, and they project out toward the leading end side of the slider 42 from the leading-side end surface 62b of the distal end portion 62a.

As shown in FIGS. 3 to 5, the leading shield 64, formed of a soft magnetic material, is provided on the leading side of the main pole 60 so as to oppose the main pole 60 with a gap. The leading shield 64 is formed to have substantially an L-shape, and a distal end portion 64a thereof on the ABS 43 side is formed into a slender rectangular shape. A distal end surface (lower end surface) of the distal end portion 64a is exposed to the ABS 43. A trailing-side end surface 64b of the distal end portion 64a extends in the cross-track direction CT. In the ABS 43, the trailing-side end surface 64b opposes the leading-side end surface of the main magnetic pole 60 with a gap therebetween. In this embodiment, the distal end portion 64a is formed from a high magnetic permeability material so as to be integrated with the side shield 74 as one body.

The leading shield 64 comprises a second connection portion 68 joined to the main pole 60 at a position spaced apart from the ABS 43. The second connection portion 68 is formed from, for example, a soft magnetic material, and magnetically connected to an upper portion of the main pole 60, that is, a portion of the main pole 60, which is spaced apart from the ABS 43, through a non-conductive material 59. Thus, the second connecting part 68 forms a magnetic circuit together with the main magnetic pole 60 and the leading shield 64. The second recording coil 72 of the recording head 58 is wound around, for example, the second connection portion 68 so as to apply a magnetic field to this magnetic circuit.

As shown in FIGS. 3 and 6, a STO 65, which functions as a high-frequency oscillation element, is arranged between the distal end portion 60a of the main pole 60 and the distal end portion 62a of the trailing shield 62 in the write gap WG. The STO 65 comprises a spin injection layer 65a, an interlayer (nonmagnetic conductive layer) 65b and an oscillation layer 65c, which are stacked in the order from the main pole 60 side to the trailing shield 62 side, that is, in the order in the down-track direction D of the magnetic head 16. The spin injection layer 65a is joined to the trailing-side end surface 60b of the main pole 60 via a nonmagnetic conductive layer (underlying layer) 67a. The oscillation layer 65c is attached to the leading-side end surface 62b of the trailing shield 62 via a nonmagnetic conductive layer (cap layer) 67b. The stacking order of the spin injection layer 65a, the intermediate layer 65b and the oscillation layer 65c may be opposite to the above. In other words, these layers may be stacked in order from the trailing shield 62 side to the main magnetic pole 60 side.

Each of the spin injection layer 65a, the intermediate layer 65b and the oscillation layer 65c comprises a stack surface or a film surface expanding in a direction intersecting with the ABS 43, for example, in a direction orthogonal to the ABS 43. A lower end surface of at least the oscillation layer 65c, that is, in this embodiment, the lower end surface of the entire STO 65 including the spin injection layer 65a, the interlayer 65b and the oscillation layer 65c, is exposed to the ABS 43 and extends to be flush with the ABS 43. Or, the lower end surface of the STO 65 may be located to be retreated in a direction spaced apart from the ABS 43, that is, for example, in a direction perpendicular to the ABS 43 and on a back side. The lower end surface of the STO 65 is not limited to planer, but may be formed into a segment of a circle in which it is convex upward.

As shown in FIG. 6, in the ABS 43, the STO 65 is formed to have a width WS in the cross-track direction CT, which is greater than the width WP of the trailing-side end surface 60b of the main pole 60 (WS>WP). For example, the width WS of the STO 65 is about 1.1 to 1.6 times the width WP of the main pole 60. Moreover, the STO 65 is disposed to cover at least one of end edges EE1 and EE2 (ends in the cross-track direction) of the trailing side end surface 60b, that is, to extend over the end edge to the outside of the main pole 60.

In this embodiment, the STO 65 is disposed to be symmetrical with respect to the axis line C, so as to cover both the end edges EE1 and EE2 of the trailing side end surface 60b. The both ends of the STO 65 in the cross-track direction CT extend over the end edges EE1 and EE2, respectively, to the outside of the main pole 60.

As shown in FIGS. 4 and 5, the main pole 60 and the trailing shield 62 are connected to connection terminals 45 respectively via wiring lines, and further connected to the head amplifier IC 30 and the main controller 90 via the flexure 28, thereby constituting a current circuit which allows a STO drive current (bias voltage) to flow serially from the head amplifier IC to the STO 65 through the main the main magnetic pole 60 and the trailing shield 62 so as to constitute. The first recording coil 70 and the second recording coil 72 are connected to the connection terminals 45, respectively via wiring lines, and further connected to the head amplifier IC via the flexure 28.

The second recording coil 72 is wound around in a direction opposite to the winding direction of the first recording coil 70. When writing a signal in the magnetic disk 12, record current is allowed to flow through the first recording coil 70 and the second recording coil 72 from the record current supply circuit 91 of the head amplifier IC 30, and thus the main pole 60 is excited to allow magnetic flux to flow to the main pole 60. The record current supplied to the first recording coil 70 and the second recording coil 72 is controlled by the main controller 90. Note that the second recording coil 72 may be connected in series with the first recording coil 70. It is also possible that a current supply to the first recording coil 70 and the second recording coil 72 may be separately controlled.

As shown in FIG. 4, the magnetic head 16 further comprises a first heater 76a and a second heater 76b. The first heater 76a is provided near the recording head 58, for example, between the first recording coil 70 and the second recording coil 72 and near the main pole 60. The second heater 76b is provided near the read head 54. The first heater 76a and the second heater 76b are connected to the connection terminals 45, respectively, through wiring lines, and further connected to the head amplifier IC 30 through the flexure 28.

While the HOD 10 configured as described above is in operation, the main controller 90 causes the driver IC 92 to drive the spindle motor 21 under the control of the MPU 97, thereby rotating the magnetic disk 12 at a predetermined speed. The main controller 90 also causes the driver IC 92 to drive the VCM 22, thereby moving and positioning the magnetic heads 16 to and on a desired track of the magnetic disk 12. The ABS 43 of the magnetic head 16 opposes the disk surface while maintaining a gap therebetween. In this state, recorded data is read from the magnetic disk 12 by the read head 54 and data is written thereto by the recording head 58.

When writing data, the bias voltage supply circuit 93 of the head amplifier IC 30 applies bias voltage to the main pole 60 and the trailing shield 62 under the control of the MPU 97, thereby allowing drive current to flow through the connection terminals 45, the wiring lines, the main pole 60, the STO 65 and the trailing shield 62 in series. Thus, the drive current flows in a direction perpendicular to the layer-stacking surface of the STO 65. The STO 65 oscillates spin torque to generate a high frequency field and applies the high frequency field to the magnetic recording layer 103 of the magnetic disk 12.

Simultaneously, the recording current supply circuit 91 of the head amplifier IC 30 supplies record current to the first recording coil 70 and the second recording coil 72 according to a recording signal and a recording pattern generated from a R/W channel 42.

The first and second recording coils 70 and 72 magnetize the main pole 60 to generate a recording magnetic field, and apply, from the main pole 60, the record magnetic field in the direction perpendicular to the magnetic recording layer 103 of the magnetic disk 12 directly thereunder. In this manner, data is recorded in the magnetic recording layer 103 with a predetermined track width. By superimposing the high frequency magnetic field of the STO 65 on the recording magnetic field, the magnetization inversion of the magnetic recording layer 103 is stimulated, thus making it possible to perform magnetic recording of high magnetic anisotropy energy. Moreover, the spin torque oscillated from the STO 65 is directed in a direction opposite to the direction of the gap magnetic field produced between the main pole 60 and the trailing shield. Therefore, the spin torque acts to reduce the leakage flux which flows into the trailing shield 62 directly from the main pole 60. Thus, the amount of the magnetic flux flowing from the main pole 60 towards the magnetic recording layer 103 of the magnetic disk 12 increases, thus making it possible to write desired data to the magnetic recording layer 103. According to this embodiment, the width WS of the STO 65 is greater than the width WP of the trailing-side end surface 60b of the main pole 60, and the STO 65 is disposed to cover both the end edges EE1 and EE2 of the main pole 60. Thus, the STO 65 is able to suppress return magnetic field (leak magnetic field) directed to the trailing shield 62 from both the end portions of the main pole 60. Therefore, it is possible to prevent degrading of the recording signals of adjacent tracks, which may result from a return magnetic field, and to improve the quality of recording signal and further the recording density.

As described above, according to the first embodiment, a magnetic head which can improve the quality of recording signals and the recording density, and also a magnetic disk device comprising the head can be obtained.

Note, as mentioned above, it is preferable that the ST065 be formed to have a width WS which is greater than the width WP of the trailing-side end portion of the main pole 60, but there may be some magnetic heads with a width WS of the STO 65, which is smaller than the width WP of the main pole 60 due to a manufacture error or on purpose.

Under these circumstances, the HOD 10 according to the first embodiment is configured to have functions of adjusting and controlling the bias voltage and/or bias polarity, so as to be able to suppress the production of the return magnetic field from the end portion of the main pole 60 even with a magnetic head having a width WS of the STO 65, which is smaller than the width WP of the main pole 60.

As shown in FIG. 1, the memory 80 of the main controller 90 contains the STO bias voltage setting table 82 which contains the relationship between the physical width relative ratio WP/WS of the recording head and the optimal STO bias voltage and the STO bias polarity setting table 84 which contains the relationship between the physical width relative ratio WP/WS and the polarity of the optimal bias voltage. The STO bias voltage controller 86 of the MPU 97 selects the optimal bias voltage from the STO bias voltage setting table 82 according to the width relative ratio WP/WS of the recording head 58, and sets a bias voltage to be applied to the STO 65 to the set bias voltage. Moreover, the STO bias polarity controller 88 selects the optimal bias polarity from the STO bias polarity setting table 84 according to the width relative ratio WP/WS of the recording head 58, and sets a polarity of the bias to be applied to the STO 65 to the polarity.

Figure 7:
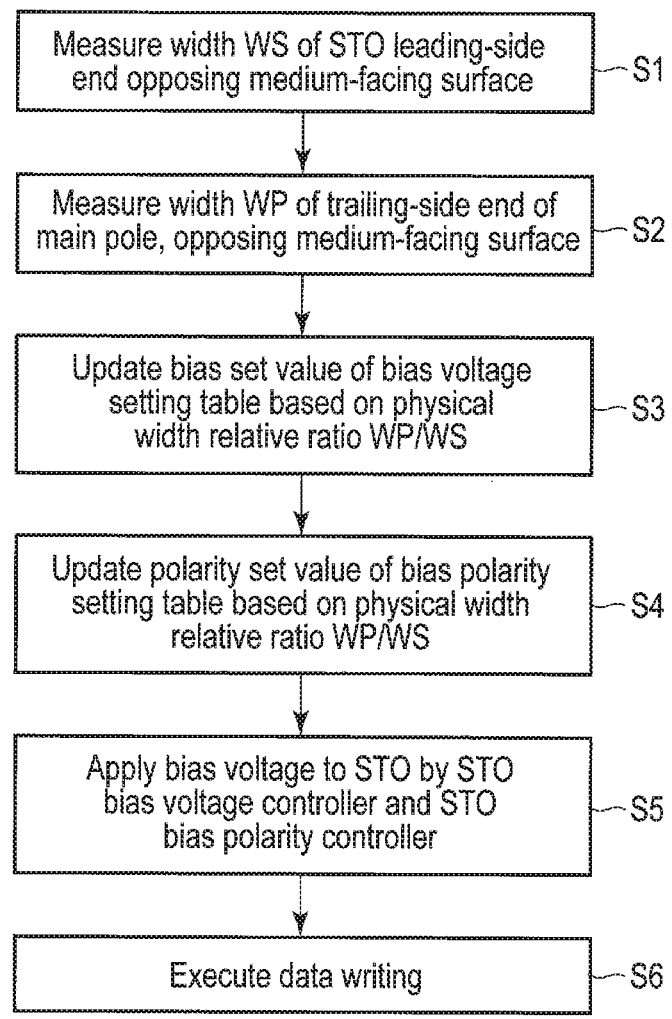
FIG. 7 is a block diagram schematically showing a flow of executing bias voltage adjustment and bias polarity adjustment in the HDD.

FIG. 7 is a block diagram schematically showing the flow of control of the bias voltage. As shown here, in the initialization of the HOD 10, the main controller 90 measures the width WS of the leading-side end surface of the STO 65 in the surface of the magnetic head 16, which opposes the medium (ABS 43) (step S1), and records the measurement result on the memory 80. Simultaneously, the main controller 90 measures the width WP of the trailing-side end surface of the main pole 60 in the ABS 43 of the magnetic head 16 (S2), and records the measurement result on the memory 80.

Figure 8A:
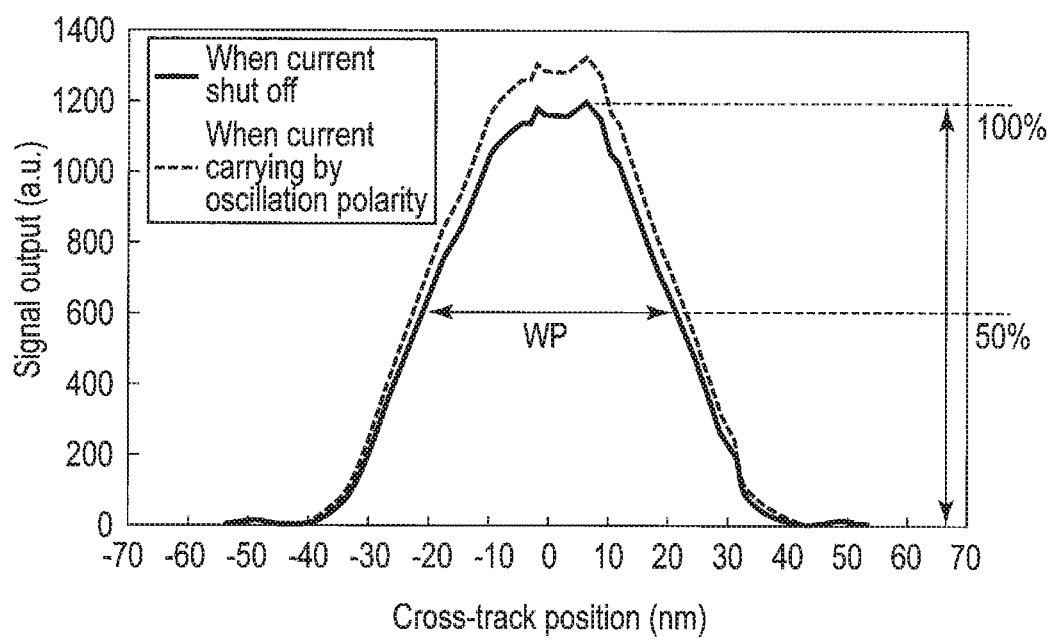
FIG. 8A is a diagram showing the relationship between a cross track position and a signal output, used when measuring a width WP of a main pole.
Figure 8B:
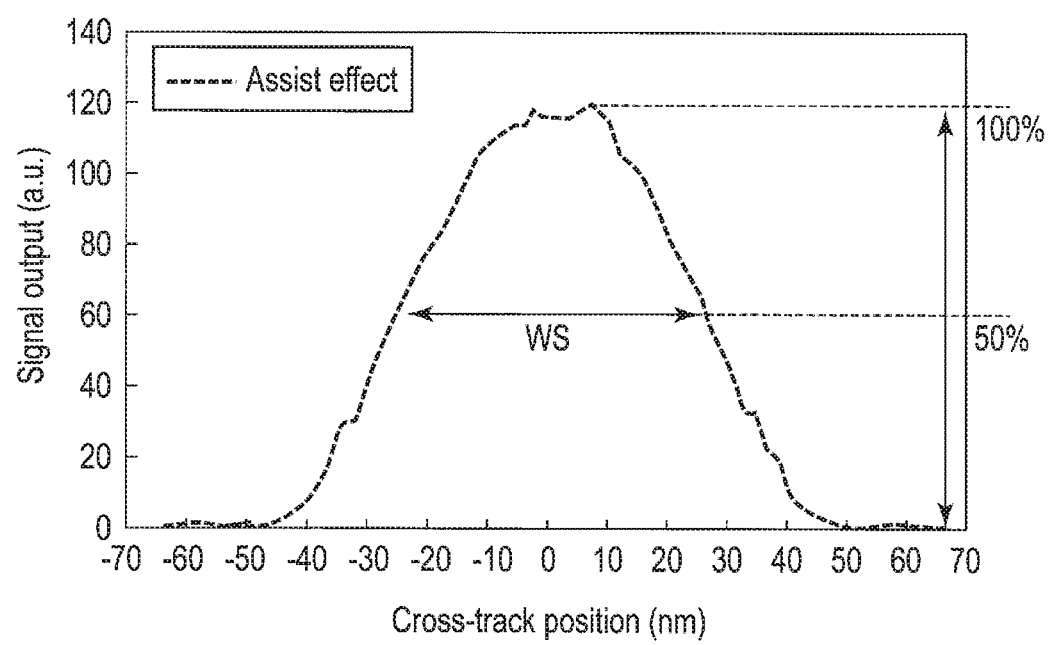
FIG. 8B is a diagram showing the relationship between a cross track position and a signal output, used when measuring a width WS of a spin torque oscillator (STO).

Here, the method of measuring the width will be described. As shown in FIG. 8A, for example, the width WP of the main pole 60 can be confirmed by measuring the off-track profile of the record signal output when the bias voltage of the ST065 is turned OFF, and then obtaining a half value width (a position at 50%). Moreover, as shown in FIG. 8B, the width WS of the STO 65 can be confirmed by measuring the off-track profile of a differential output value between the record signal output when the bias voltage of the STO 65 is turned OFF, and the record signal output when the electricity reference bias voltage is applied to the STO 65, and obtaining half-value width (a position at 50%).

Note that the above described reference bias voltage can be confirmed by, as shown in FIG. 9A, for example, measuring a differential absolute value delta R while increasing the absolute value of the bias voltage, the delta R being a differential absolute value between the resistance of the STO when bias voltage is applied by the polarity oscillated by the STO 65 and the resistance of the STO when bias voltage is applied by the polarity reversed to the oscillation direction. For example, in FIG. 9A, it suffices if the bias voltage value at the time when the differential absolute value delta R reaches 90% in level with respect to the maximum of the differential absolute value delta R is set as a reference bias voltage.

Or, as shown in FIG. 9B, let us suppose that a differential absolute value between over write characteristics when bias voltage is applied to the STO 65 by the polarity oscillated by the STO 65 and over write characteristics when bias voltage of polarity reversed to the oscillation direction is applied to the STO 65 is defined as a delta OW. Here, the delta OW is measured while increasing the absolute value of the bias voltage, and, for example, the bias voltage value at the time when the delta OW reaches 90% in level with respect to the maximum of the delta OW may be set as the reference bias voltage.

As shown in FIG. 7, after measuring the widths WP and WS, the main controller 90 calculates out the physical width relative ratio WP/WS from the measured widths, and the STO bias voltage controller 86 selects an optimal bias voltage from the STO bias voltage setting table 82 according to the physical width relative ratio WP/WS and sets the bias voltage to be applied to the STO 65 to the selected bias voltage (Step S3).

FIG. 10 is a diagram showing an example of adjustment of the bias voltage according to the physical width relative ratio WP/WS.

As described above, the width WS of the STO 65 should preferably be greater than the width WP of the main pole 60, and if it is less than the width WP of the main pole 60, the leak magnetic field directed from the end portion of the main pole towards the write shield enlarges. Therefore, as the width WS of the STO 65 is narrower, that is, the physical width relative ratio WP/WS is greater, the bias voltage should preferably be lower. For example, as indicated by characteristics (a) shown in FIG. 10, the bias voltage may be adjusted with the increase in physical width relative ratio WP/WS so as to reduce the bias voltage uniquely with respect to the reference bias.

On the other hand, in a region where the width relative ratio WP/WS is 1.05 or less, the influence of the above-described leak magnetic field may be small. Therefore, for example, as indicated in characteristics (b) shown in FIG. 10, it is also possible to set the bias voltage as the reference bias voltage (for example, 200 mV) while the width relative ratio WP/WS is within a predetermined threshold Vth1, and, in a region where the threshold Vth1 is 1 or higher, to adjust to reduce the bias voltage uniquely with respect to the reference bias according to the increase in relative ratio WP/WS.

On the other hand, when there is a great influence by a leak magnetic field, as indicated by characteristics (c) shown in FIG. 10, the bias voltage may be adjusted to reduce uniquely with respect to the reference bias voltage with the increase in width relative ratio WP/WS in a region where the width relative ratio WP/WS is within a predetermined threshold Vth2 or less, and in a region where it is a threshold Vth2 or higher, the bias voltage may be turned OFF, that is, the bias voltage may be set as zero.

Note that the thresholds Vth1 and Vth2 can be set within a range of, for example, 0.87 to 1.13 (width relative ratio WP/WS). Moreover, the reference bias voltage can be set in a similar manner as the reference bias voltage shown in FIGS. 9A and 9B.

After adjusting the bias voltage with the STO bias voltage controller 86 described above, as shown in FIG. 7, the STO bias polarity controller 88 may select a corresponding polarity from the STO bias polarity setting table 84 according to the physical width relative ratio WP/Ws to adjust the bias voltage to be applied to the STO 65 to the selected polarity (S4). Here, the polarity includes an oscillation bias polarity oscillated by the STO 65 and an reverse bias polarity of an opposite direction in which the STO 65 does not oscillate.

FIG. 11 is a diagram showing an example of adjustment of the bias polarity according to the physical width relative ratio WP/WS.

As illustrated, the STO bias polarity controller 88 sets the bias polarity to the oscillation bias polarity and maintains the bias voltage in the reference bias in a region where the physical width relative ratio WP/WS is at a switching threshold Vth3 or less. The STO bias polarity controller 88, if the width relative ratio WP/Ws is greater than the threshold Vth3, switches the bias polarity to the reversed polarity in which the STO 65 does not oscillate, that is, switches it to the polarity which shuts off the oscillation of the STO 65. The polar switching threshold Vth3 is set to, for example 0.87 to 1.13 (width relative ratio WP/WS).

After adjusting the bias voltage or bias polarity as described above, as shown in FIG. 7, the adjusted bias voltage is applied from the bias voltage supply circuit 93 to the STO 65 (Step S5), to execute data writing operation (Step S6).

Thus, when the width relative ratio WP/WS of the recording head 58 is great, that is, when the width WS of the STO 65 is less than or equal to the width WP of the main pole 60, the bias voltage which drives the STO 65 is reduced or shut off, or the bias polarity is switched to reversed polarity to shut off the oscillation of the STO 65. In this manner, excessive oscillation of the STO 65 is suppressed, thereby making it possible to suppress the leak magnetic field from the end portion of the main pole 60. Thus, the adverse effect on adjacent tracks or deterioration of the recording signals on adjacent tracks can be prevented, and thus it is possible to improve the quality of recording signals and further to improve the recording density.

FIG. 12 is a diagram showing the relationship between the position of the recording head in the cross-track direction and a head effective field in the recording head of the HDD according to this embodiment and a recording head of an HDD according to a comparative example as compared with each other. Note that the recording head according to the comparative example has a width WS of the STO in the cross track direction, which is smaller than a width WP of the main pole in the cross-track direction.

As indicated by an arrow in FIG. 12, in the recording head according to the comparative example, a leak magnetic field is generated from both end portions of the main pole. On the other hand, in the recording head according to this embodiment, as can be seen from the figure, no leak magnetic field is generated and the effective field increases substantially uniformly from both ends of the magnetic pole toward the center of the pole.

FIG. 13 is a diagram showing the relationship between the physical width relative ratio WP/WS and recording density in the recording head according to this embodiment and that of the comparative example compared with each other. The recording head according to the comparative example uses a type which does not control the bias voltage and bias polarity according to the width relative ratio. In the recording head according to the comparative example, as the width relative ratio WP/WS becomes larger, the recording density is lowered more. On the other hand, in the recording head according to this embodiment, even when the width relative ratio WP/WS becomes large, high recording density can be obtained as seen in the figure.

FIG. 14 is a characteristic diagram showing the dependency of the physical width relative ratio WP/WS on the recording density improvement rate at the time when an STO bias voltage is applied in this embodiment. The assumable specific range of each of the thresholds Vth1, Vth2 and Vth3 of the width relative ratio WP/WS described above can be inferred by analogy from the results of the recording density improvement rate with respect to the width relative ratio WP/WS at the time when a predetermined STO bias voltage as shown in FIG. 14 is applied. Here, there is such a tendency that the higher, the width relative ratio WP/WS, the worse, the recording density improvement rate becomes due to the influence of blocking an adjacent track, caused by the leak magnetic field of the recording head 58. Such a width relative ratio WP/WS that the recording density improvement rate drops below 0% and the recording density deteriorates further, is within a range of R1 to R2 with an average value of ±1a (the characteristic (a) is at the average value, the characteristic (b) is −1 and the characteristic (c) is +1a), and is about 0.87 or more but 1.13 or less as can be seen. It suffices if these physical width relative ratios WP/WS are set to thresholds Vth1, Vth2 and Vth3, respectively.

As described above, according to the HDD of this embodiment, the bias voltage or bias polarity is adjusted according to the physical width relative ratio WP/WS of the recording head 58, and thus even if the width WS of the STO is narrow, it is still possible to suppress the leak magnetic field from the end portions of the main pole, and the deterioration of recording signals on adjacent tracks, which may occur when driving the STO, can be prevented. Thus, it is possible to improve the quality of recording signals and further to improve the recording density.

Next, a magnetic recording head of an HDD according to another embodiment will be described. In the following embodiment, structural parts identical to those of the first embodiment described above will be designated by the same reference numbers, and detailed descriptions therefor may be omitted.

Second Embodiment

Figure 15:
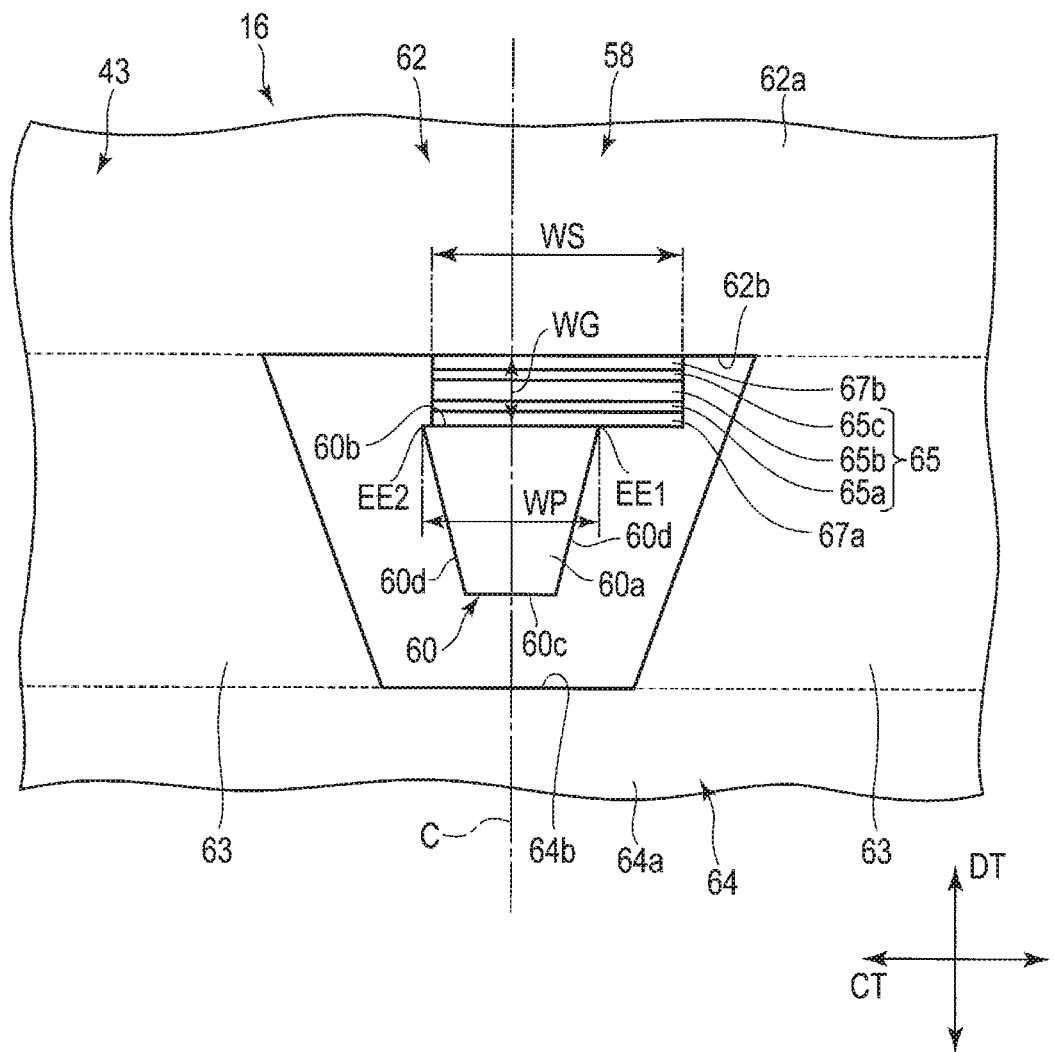
FIG. 15 is a plan view showing a recording head of a magnetic head according to a second embodiment, as viewed from an ABS side.

FIG. 15 is a plan view showing a recording head of the magnetic head of the HDD of a second embodiment as viewed from an ABS side. In the second embodiment, as illustrated, the ST065 has a width WS in the cross-track direction CT, which is, in the ABS 43, greater than a width WP of the trailing side end surface 60b of the main pole 60 (WS>WP). For example, the width WS of the STO 65 is set to about 1.1 to 1.6 times the width WP of the main pole 60. Further, the STO 65 is disposed to cover one end edge (an end in the cross-track direction) EE1 of the trailing side end surface 60b, that is, to extend over the end edge EE1 to the outside of the main pole 60. In this embodiment, the STO 65 is disclosed to be shifted in one direction of the cross-track directions with respect to the central axis C, and is spaced apart from the other end edge EE2 of the trailing side end surface 60b to an end edge EE1 side. That is, the STO 65 covers one end edge EE1 of the main pole 60, and does not cover the other end edge EE2.

The magnetic head 16 according to this embodiment can be effectively utilized in HDDs which adopt shingled recording. In the shingled recording, data is written by the recording head 58 mainly using a record magnetic field produced from one end portion of the main pole 60 in the cross-track direction CT. Therefore, the STO 65 is disclosed to cover the one end portion of the main pole 60, thereby suppressing the leak magnetic field from the one end portion. Thus, the deterioration of signals on adjacent tracks can be prevented. In this manner, it is possible to improve the quality of signals and further the recording density. Moreover, in the shingled recording, even if a leak magnetic field is generated from the other end portion of the main pole 60, the leak magnetic field does not affect adjacent tracks.

In the second embodiment, the other structures of the magnetic head 16 and the HOD are the same as those in the first embodiment described above.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the recording heads according to the above-provided embodiments are applicable also to recording heads without a leading shield and/or a side shield. In the case of a recording head comprising a leading shield, a high-frequency oscillation element can be disposed in a gap between the main pole and the leading shield. The high-frequency oscillation element is not limited to a spin torque oscillator, but some other high frequency oscillation elements may be employed.

Apart from the above, for example, the materials, shapes and sizes of elements constituting the head unit can be changed as needed. In the magnetic disk device, the number of magnetic disks and magnetic heads can be changed as needed. The size of the magnetic disks can be selected in various ways.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
an air bearing surface;
a main pole comprising a distal end portion extending to the air bearing surface;
a write shield magnetic pole opposed to the distal end portion of the main pole with a write gap therebetween and constituting a magnetic core with the main pole;
a coil which excites magnetic flux to the magnetic core; and
a high-frequency oscillation element provided between the main pole and the write shield magnetic pole within the write gap,
the main pole comprising a shield-side end surface opposing the write shield magnetic pole with the write gap therebetween and brought into contact with the high frequency oscillation element,
the high-frequency oscillation element including a width WS in a cross-track direction, in the air bearing surface, greater than a width WP of the shield-side end surface in the cross-track direction, and the high-frequency oscillation element being arranged to extend over at least one end edge of the shield-side end surface in the cross-track direction to an outer side of the main pole.

2. The magnetic head of claim 1, wherein
the high-frequency oscillation element comprises both end portions in the cross-track direction, and the both end portions extend over the respective end edges of the shield side end surface in the cross-track direction to the outer side of the main pole.

3. The magnetic head of claim 1, wherein
the high-frequency oscillation element comprises both end portions in the cross-track direction, and one end portion extends over one of the end edges of the shield side end surface in the cross-track direction to the outer side of the main pole, and the other end portion is located to be spaced apart from another one of the end edges of the shield side end surface in the cross-track direction to a side of the one end edge.

4. A disk device comprising:
a rotatable disk-shaped recording medium comprising a magnetic recording layer, and
the magnetic head of claim 1, which is configured to write data to the recording layer.

5. The disk device of claim 4, wherein
the high-frequency oscillation element comprises both end portions in the cross-track direction, and the both end portions extend over the respective end edges of the shield side end surface in the cross-track direction to the outer side of the main pole.

6. The disk device of claim 4, wherein
the high-frequency oscillation element comprises both end portions in the cross-track direction, and one end portion extends over one of the end edges of the shield side end surface in the cross-track direction to the outer side of the main pole, and the other end portion is spaced apart from another one of the end edges of the shield side end surface in the cross-track direction to a side of the one end edge.

7. A disk device comprising:
a rotatable disk-shaped recording medium comprising a magnetic recording layer;
a magnetic head configured to write data to the magnetic recording layer, the magnetic head comprising an air bearing surface, a main pole comprising a distal end portion extending to the air bearing surface, a write shield magnetic pole opposed to the distal end portion of the main pole with a write gap therebetween and constituting a magnetic core with the main pole, a coil which excites magnetic flux to the magnetic core and a high-frequency oscillation element provided between the main pole and the write shield magnetic pole within the write gap; and
a controller which drives the magnetic head,
the main pole comprising a shield-side end surface opposing the write shield magnetic pole with the write gap therebetween and brought into contact with the high frequency oscillation element, and
the controller comprising a bias voltage supply circuit which applies bias voltage to the high frequency oscillation element, a bias voltage controller which adjusts the bias voltage according to a width relative ratio (WP/WS) between a width WP of the high-frequency oscillation element in the cross-track direction in the air bearing surface and a width WS of the shield-side end surface in the cross-track direction, and a bias polarity controller which switches current-carrying polarity of a bias to be applied to the high frequency oscillation element according to the width relative ratio (WP/WS).

8. The disk device of claim 7, wherein
the bias voltage controller adjusts the bias voltage to reduce with respect to a reference bias as the width relative ratio (WP/WS) increases.

9. The disk device of claim 7, wherein
the bias voltage controller reduces the bias voltage with respect to a reference bias or shuts the bias voltage when the width relative ratio (WP/WS) is greater than or equal to a first threshold.

10. The device of claim 9, wherein
the first threshold is set to a width relative ratio (WP/WS) of 0.87 or more but 1.13 or less.

11. The device of claim 7, wherein
the bias polarity controller switches the current-carrying polarity of the bias voltage to a reversed polarity opposite to a direction in which the high-frequency oscillation element oscillates when the width relative ratio (WP/WS) is greater than or equal to a second threshold.

12. The device of claim 11, wherein
the second threshold is set to a width relative ratio (WP/WS) of 0.87 or more but 1.13 or less.

* * * * *